United States Patent [19]

Youngberg et al.

[11] Patent Number: 5,203,149

[45] Date of Patent: Apr. 20, 1993

[54] SLOPE MOWER

[75] Inventors: Norman R. Youngberg; Cyril A. Malinski, both of Ottawa County, Okla.

[73] Assignee: N-R Industries, Inc., Miami, Okla.

[21] Appl. No.: 912,309

[22] Filed: Jul. 13, 1992

Related U.S. Application Data

[62] Division of Ser. No. 644,850, Jan. 23, 1991, Pat. No. 5,129,218.

[51] Int. Cl.$^5$ .............................................. A01D 34/76
[52] U.S. Cl. ..................................... 56/14.9; 56/15.6; 56/15.8
[58] Field of Search ...................... 56/14.9, 14.7, 14.8, 56/15.7, 15.8, 15.9, 15.6, 15.2, 6

[56] References Cited

U.S. PATENT DOCUMENTS

| | | | |
|---|---|---|---|
| 2,994,174 | 8/1961 | Northcote et al. | 56/25.4 |
| 3,408,798 | 1/1968 | Hale et al. | 56/25.4 |
| 3,796,028 | 3/1974 | Federspiel | 56/15.2 |
| 4,320,616 | 3/1982 | Marto | 56/15.3 |
| 4,515,392 | 5/1985 | Torras | 280/755 |
| 4,707,971 | 11/1987 | Forpahl et al. | 56/6 |
| 4,869,054 | 9/1989 | Hostetler | 56/6 |
| 4,916,889 | 4/1990 | Molstad | 56/15.6 X |
| 5,085,042 | 2/1992 | Lansdowne | 56/15.2 X |

Primary Examiner—Terry Lee Melius
Attorney, Agent, or Firm—Head & Johnson

[57] ABSTRACT

A slope mower which can tilt a tractor body upslope about pivot points on the front and rear axles during operations on sloping terrain. The slope mower has a novel all geared powered belly mower and also has a novel mower lifting system. The slope mower also has a novel three point hitch attached to the tractor axle which allows for attaching utility devices but does not interfere with the tilting mechanism. The slope mower also has the ability to transfer engine power to the rear of the slope mower. Upon removal of the belly mower, a power take off is extended through both the front axle pivot point and the rear axle pivot point. This allows engine power to be transferred to a rear utility device without affecting the tilting ability of the slope mower. Reinforced caster wheels are attached to the belly mower.

2 Claims, 10 Drawing Sheets

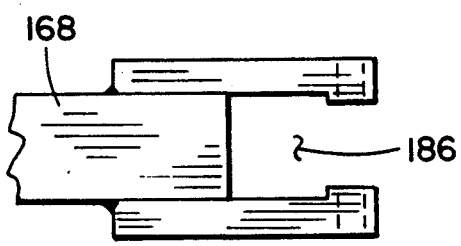
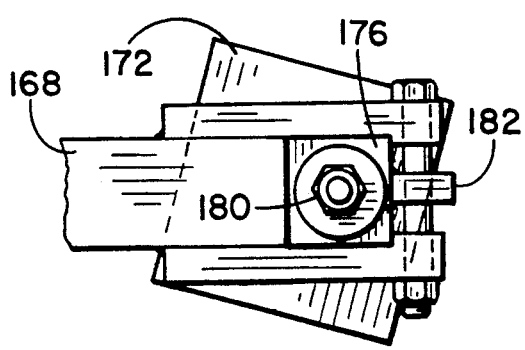
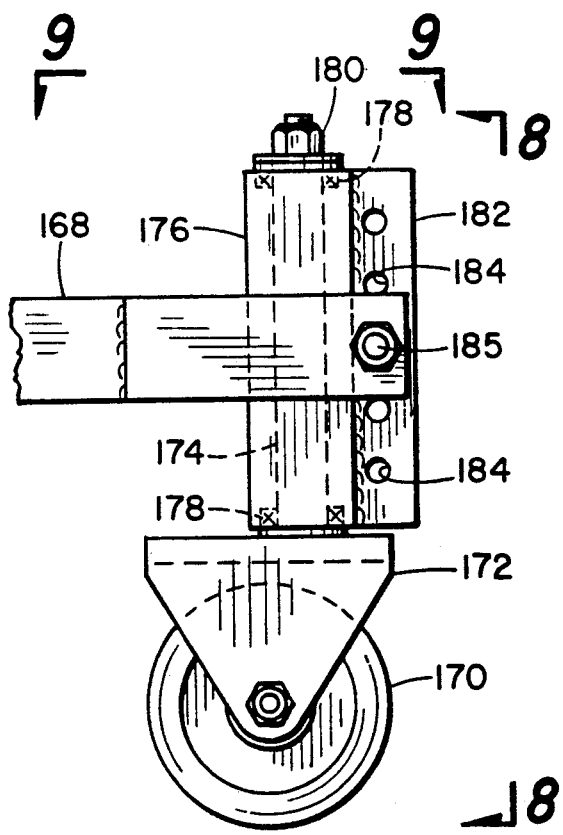
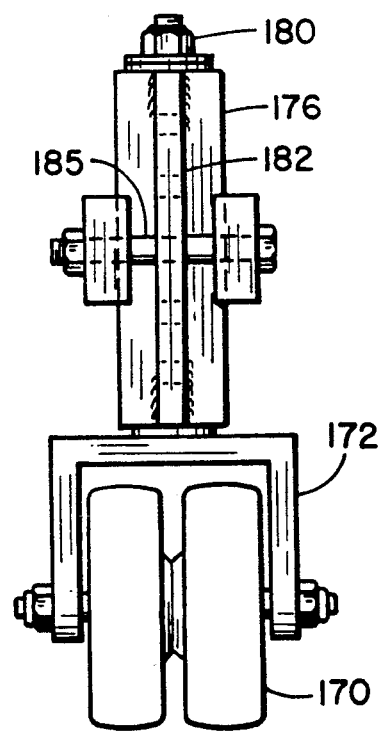

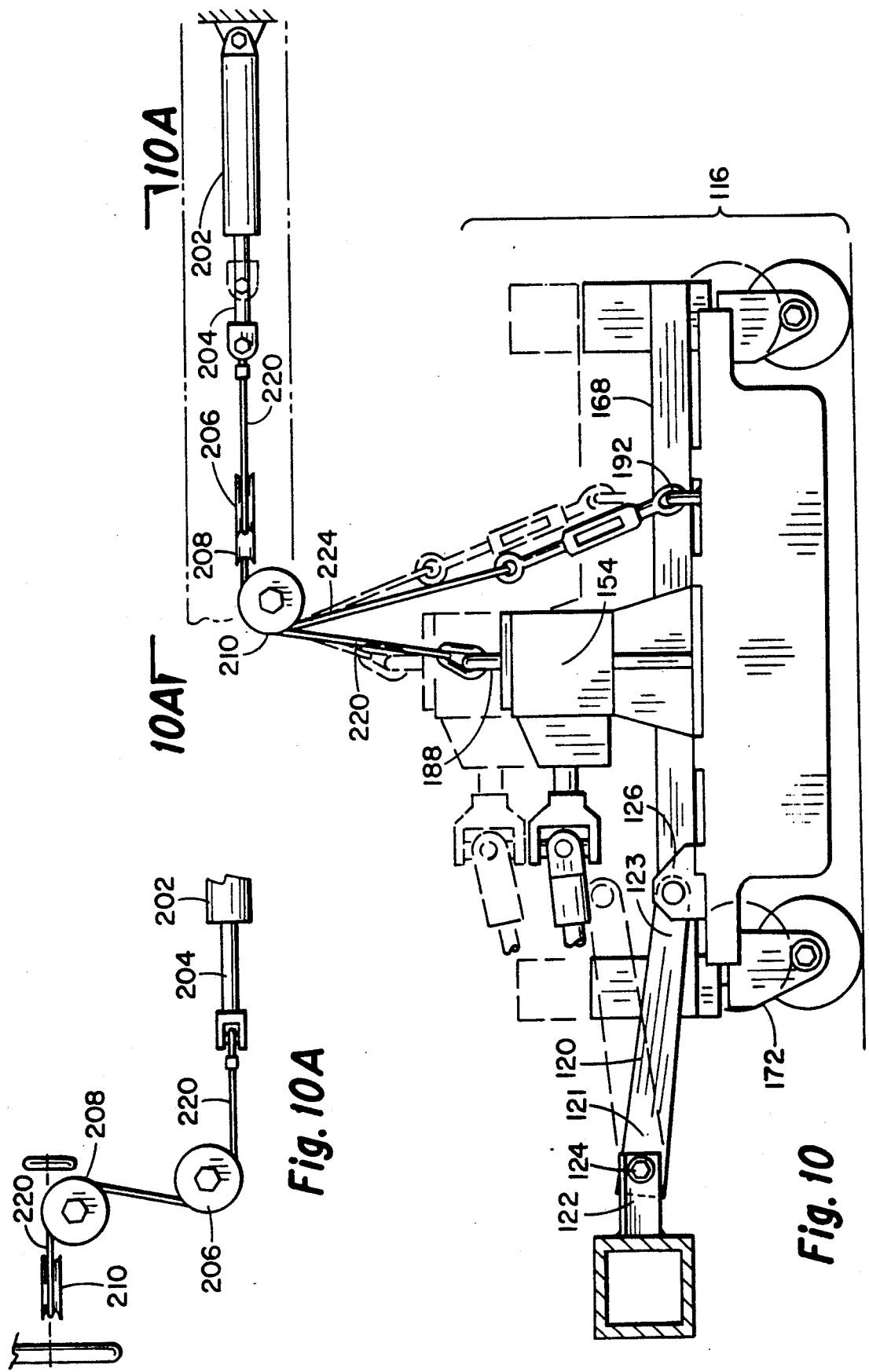

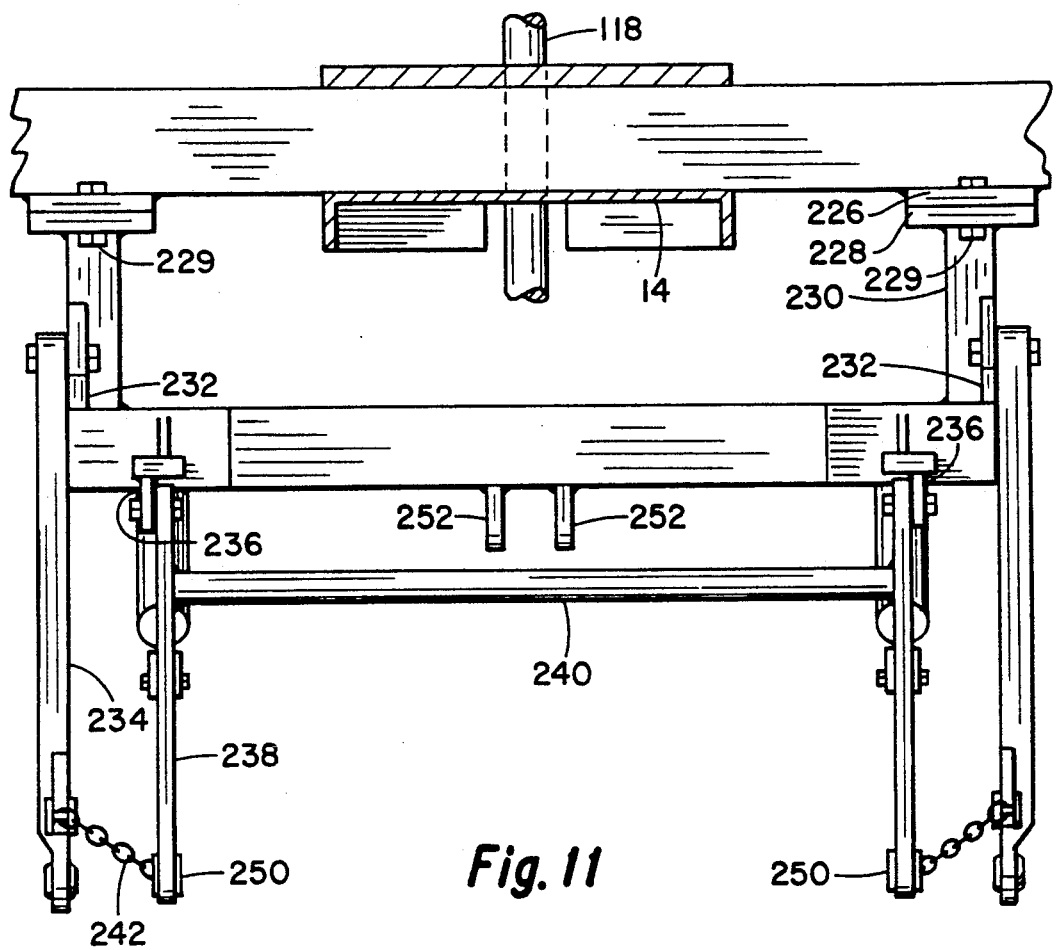
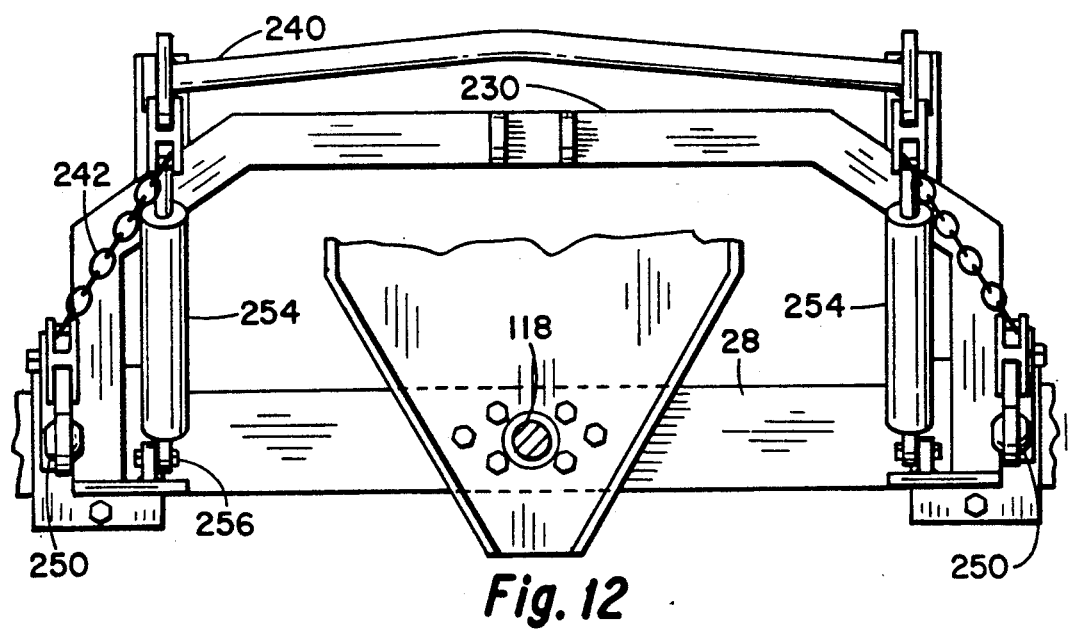

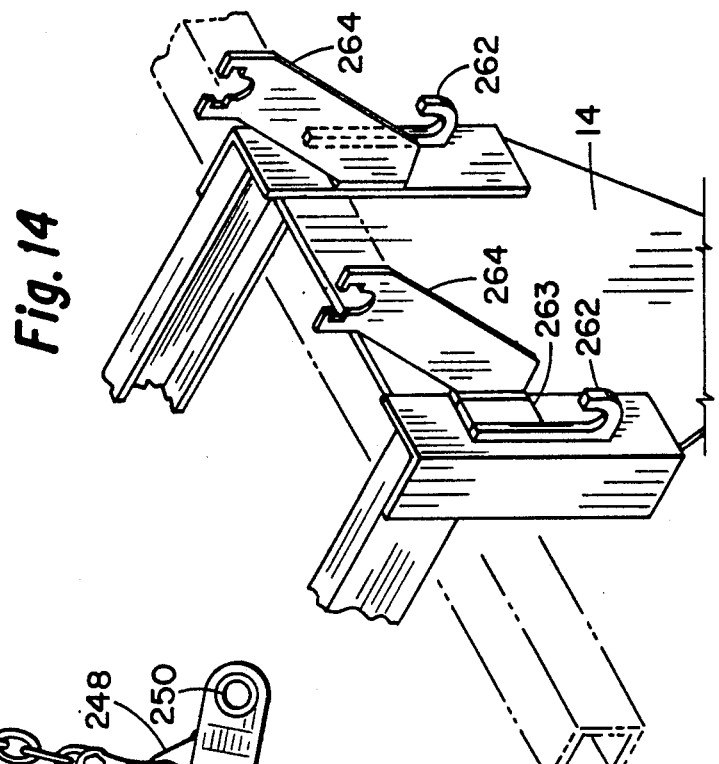
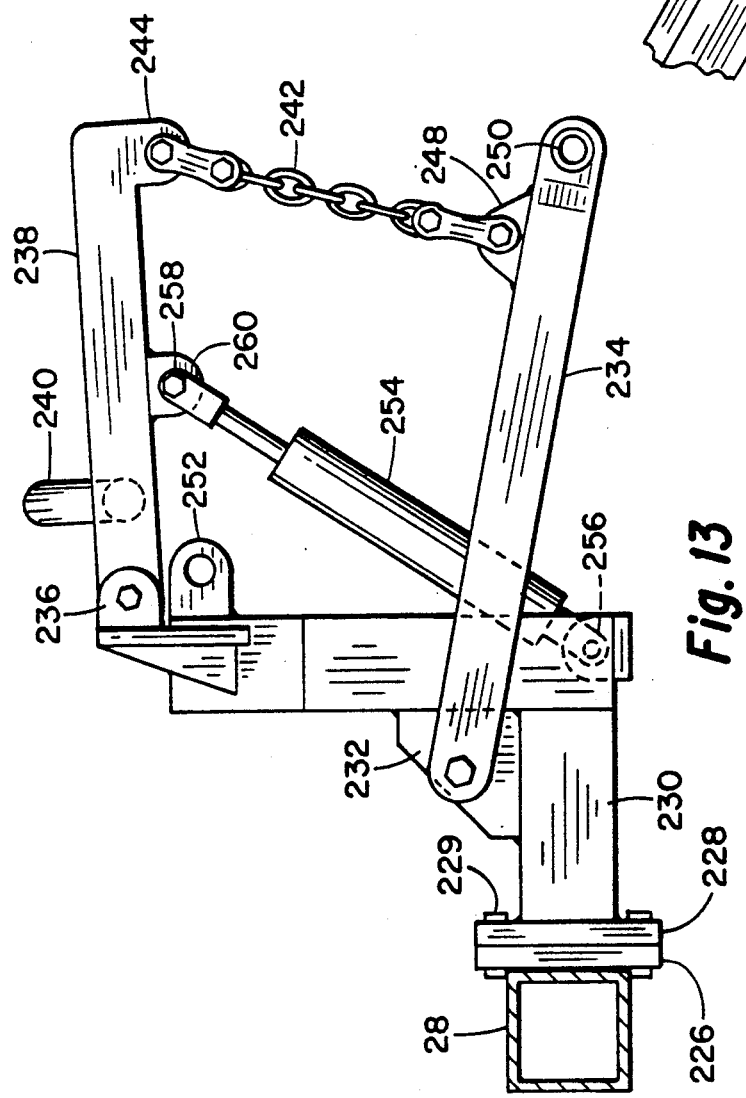

SLOPE MOWER

This is a divisional application of copending Ser. No. 07/644,850 filed on Jan. 23, 1991 now U.S. Pat. No. 5,129,218.

The Northcote et al patent discloses an improved hitch means so that a rotary mower may be towed behind a farm tractor or supported or in relation to the tractor. The rotary mower, in a supported relationship with respect to the tractor, has a means for accommodating a floating action.

The Marto patent discloses a parallel linkage suspension for a tractor mounted mower which maintains blade level and drive belt tension.

The Torras patent discloses a slope mower which is able to climb steep embankments due to the placement of a tail plate limiting the tipping which occurs when the tractor operator attempts to exceed the critical angle of attack.

The Forpahl patent and also the Hostetler continuation-in-part patents disclose a slope mower which has single front and rear wheels which enable tractor with bat wings attached, to conform to changing sloping terrain.

The Hale patent discloses a slope mower in which the tractor body is pivotally attached to its supporting axles allowing the mower to remain parallel to the sloped terrain while the tractor frame is maintained in a vertical position.

BACKGROUND OF THE DISCLOSURE

1. Field of the Invention

This invention relates to a mower capable of mowing sloping terrain wherein the mower has a reduced probability of overturning because the operator can tilt the tractor frame upslope maintaining a properly positioned center of gravity.

2. Description of the Related Art

Tractor mounted mowers capable of mowing on sloping terrain are common in the industry. The mower assembly may be suspended beneath the tractor, attached to "bat wings" on the sides of the tractor, mounted on the front of the tractor, or towed behind the tractor.

Tractor vehicles with mower attachments have long been used in mowing sloping surfaces, particularly by highway maintenance personnel. Most tractors used to mow do not have the ability to change its center of gravity during mowing operations. When sloping terrain is encountered, the center of gravity of the tractor changes, thus increasing the likelihood of tipping over. This situation presents significant hazards to the operator. Some prior slope mowers have attempted to counteract the increased probability of roll over as the terrain slope angle increases, by changing the center of gravity by leveling the tractor frame in a horizontal orientation with respect to the slope angle. Other devices have attempted to overcome this problem by changing the mover deck configuration such that the blade housing changes with respect to variances in the terrain slope. Most of these devices have presented complex solutions to this problem.

SUMMARY OF THE INVENTION

This invention concerns a slope mower of relative simple design in which the tractor can change the location of its center of gravity by tilting the tractor frame so that it remains level even though the tractor is operating on a sloping surface. This invention ensures the operator can remain seated during mowing operations on sloped terrain with decreased risks that are associated with sloping terrain mowing operations.

One improved embodiment of this invention is the transfer of engine power using a power take off to delivery power to a jack shaft passing through a pivot point located at the point where the tractor body is rotatably mounted on the front axle. This arrangement provides engine power so that a variety of attachments can be operated from the rear of the tractor without inhibiting the tilting or leveling function of the tractor frame.

A second embodiment of this invention is a novel mower deck. The mower cutting system is an all geared system which replaces the normal configuration of using a series of rubber belts. Should the mower blades be suddenly stopped by part of the terrain two shear pins, one located within the geared drive system and one located between the mower blades and the mower blade bar, prevent stripping of the gears. In this improvement a double chain attached to two independent sprockets allow the mower deck to flex without disturbing the blade drive capabilities.

A third improved embodiment of this invention is a unique mower deck lifting arrangement. The lifting system is operated by a hydraulic cylinder which is attached to two adjacent cables. These cables traverse a single cable path defined by a plurality of pulleys. One of the cables attaches to the mower deck at a mover lift bracket, the other cable attaches at the leveling eye behind the mower lift bracket. Two mower deck stabilizers are located on the front of the belly mower which cause the front of the mower deck to move upward in an arc. The cable attached at the mower lift bracket is at an angle such that when the mower deck is raised or lowered, the arc movement caused by the mower deck stabilizers is counteracted such that the belly mower lifts straight up or down. The mower deck bracket allows the cable to slide sideways so that while operating on sloping terrain the mower deck is not pulled to one side or the other, but the mower deck remains parallel to the sloped terrain creating an even cutting path.

A fourth improved embodiment of this invention is a three point hitch arrangement which can be mounted to either the front or rear axle or both without inhibiting the tilting or leveling of the tractor frame.

A fifth improved embodiment of this invention is a method of attachment of devices such as trenching machinery or a backhoe to the tractor body. This attachment allows for vertical operation while operating on sloping surfaces. By providing vertical operations, the roll over tendency is decreased and vertical trenching operations can be accomplished. Backhoes or trenching devices attached to conventional tractors have a high roll over tendency when operating on sloping terrain as well as producing trenches which are perpendicular to the slope and not vertical.

A sixth improved embodiment of this invention is a strengthened caster wheel attached to the mower deck. A problem often associated with past mowing operations is the bending of one or more of the stability wheels' shaft which is attached to the mower deck. When the shaft is bent, the caster yoke no longer freely rotates thereby reducing the caster's effectiveness. The casters in this invention are designed to withstand greater forces and survive the grueling impacts associated with mowing rough terrain, without causing the shafts to bend to bend which would change the mower deck height. The caster also offers an easier method of changing the adjustment height of the caster when changing the cutting height of the mower deck.

DESCRIPTION OF THE DRAWINGS

FIG. 7 is a side view taken along the line 7—7 of FIG. 2;

FIG. 8 is a front view taken along the line 8—8 of FIG. 7;

FIG. 9 is a top view taken along the line 9—9 of FIG. 7;

FIG. 9A is a top view taken along the line 9—9 FIG. 7;

FIG. 10 a side view of the belly mower;

FIG. 10A is fragmental top view of FIG. 10;

FIG. 11 is a top view of the three point hitch;

FIG. 12 is a rear view taken along the line 12—12 of FIG. 1;

FIG. 13 is a side view of the three point hitch;

FIG. 14 is perspective view of the rear of the tractor showing mounting brackets for a backhoe.

DETAILED DESCRIPTION OF THE PREFERRED EMBODIMENT

Figure 1:
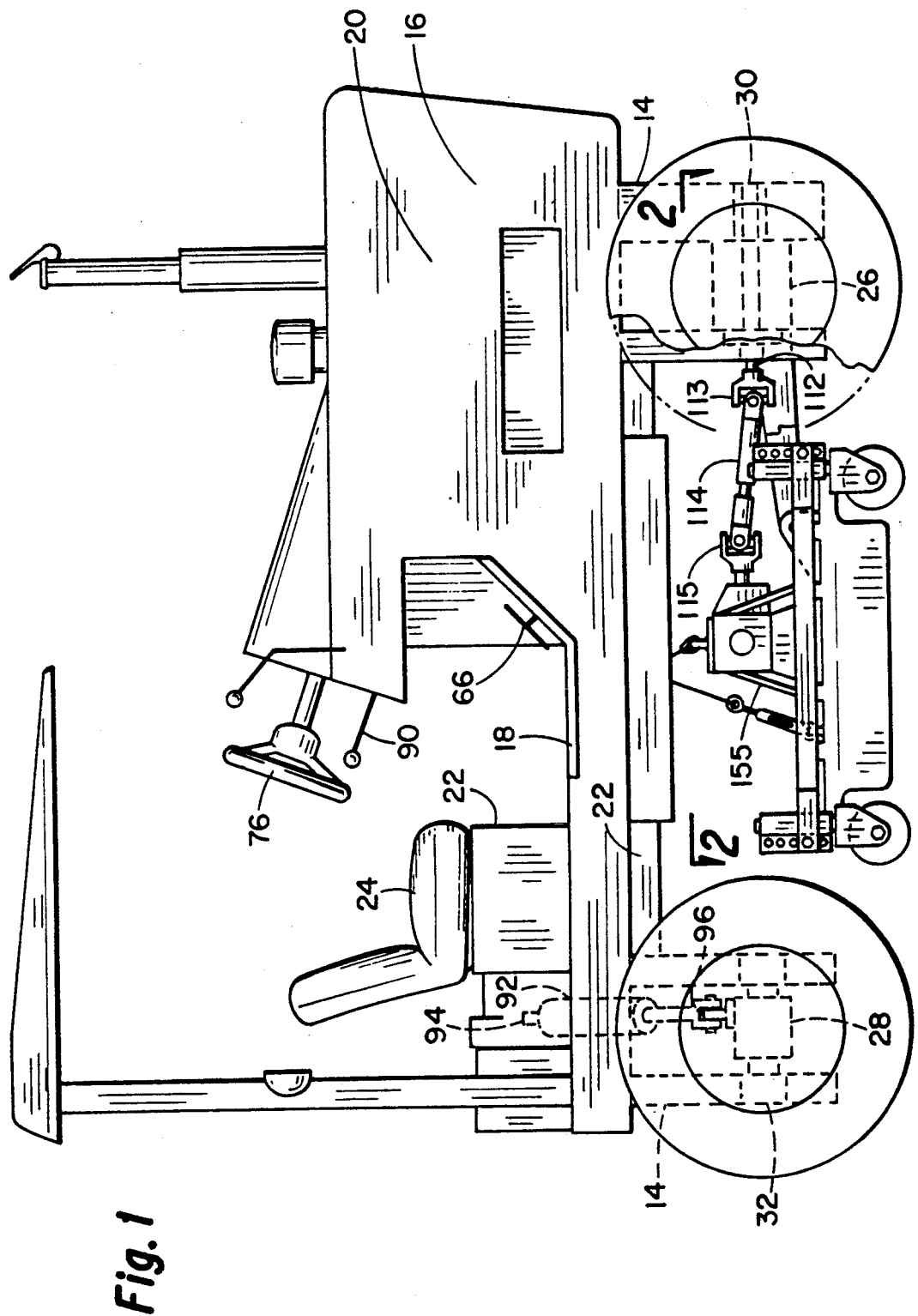
FIG. 1 is a side view of the slope mower of this invention.
Figure 4:
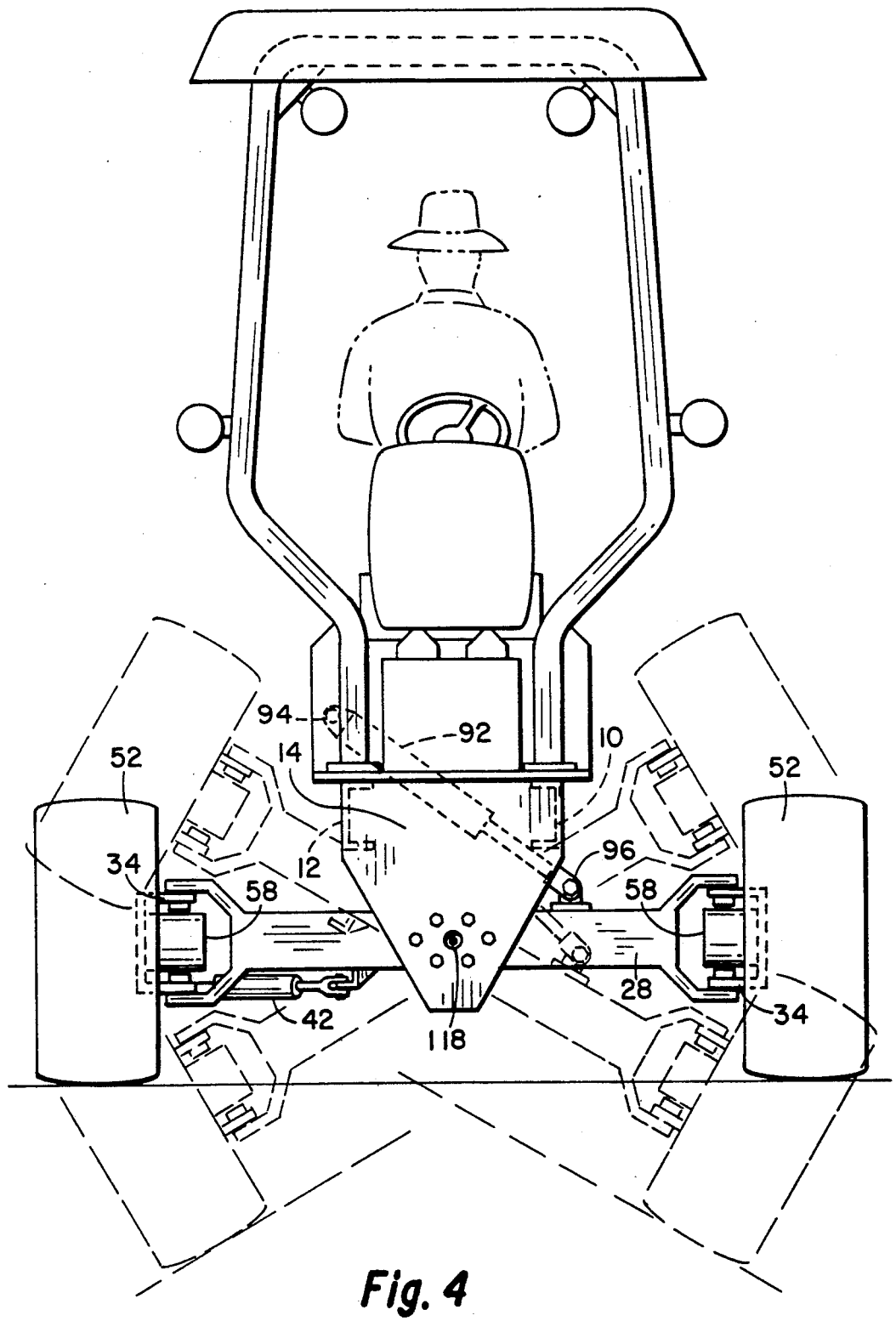
FIG. 4 is rear elevational of the slope mower.

FIG. 1 illustrates the preferred embodiment of my novel slope mower with the mower attached to the belly of the tractor frame. The tractor frame is shown as having a right tractor frame member 10 and a left tractor frame member 12 and end members 14 (shown in FIGS. 4, 5 and 6). The right and left tractor frame members 10 and 12 form the foundation for the tractor frame body 16. On the rear portion of the tractor frame is a floor plate 18 that is substantially attached, preferably welded, to frame members 10 and 12. In the front portion of the tractor body 16 is a power unit preferably an internal combustion engine 20 that is supported on the right and left tractor frame members 10 and 12. The rear portion of the floor plate 18 abuts the fuel tank 22. The fuel tank is mounted to and located in between the right and left tractor frame members 10 and 12. The operator's seat 24 attaches to the top of the fuel tank 22.

The tractor frame body 16 is pivotally carried on a front axle member 26 and a rear axle member 28 connected respectively at the front pivot point 30 and a rear pivot point 32 of front and rear axle members 26 and 28. This permits the tractor body 16 to pivot with respect to the axle members 26 and 28 when pivoting is necessary to maintain the tractor body 16 in an upright or vertical position when the wheels are on sloping terrain. Means for such pivoting will be discussed later. The front and rear axle members 26 and 28 are square shaped and have a wheel motor mount 34 (see FIG. 5) pivotally attached at each axle end. A front hydraulic steering cylinder 36 having its piston end pivotally attached to the front axle member 24 and the cylinder end pivotally attached to the front pivot member 38. A wheel pivot pin 40 connects and allows for pivotation of the wheel motor mount 34 with respect to the front axle member 26. A rear hydraulic steering cylinder 42 is located on the rear axle member 28 in similar manner as described for the front axle. The front wheels 44 turn in tandem. This is due to the attachment of a front tie rod 46 which connects the front pivot member 38 to the corresponding front pivot member 38 of the left front motor mount 50. A similar arrangement exists for the rear axle allowing the rear wheels 52 to turn in tandem.

Figure 3:
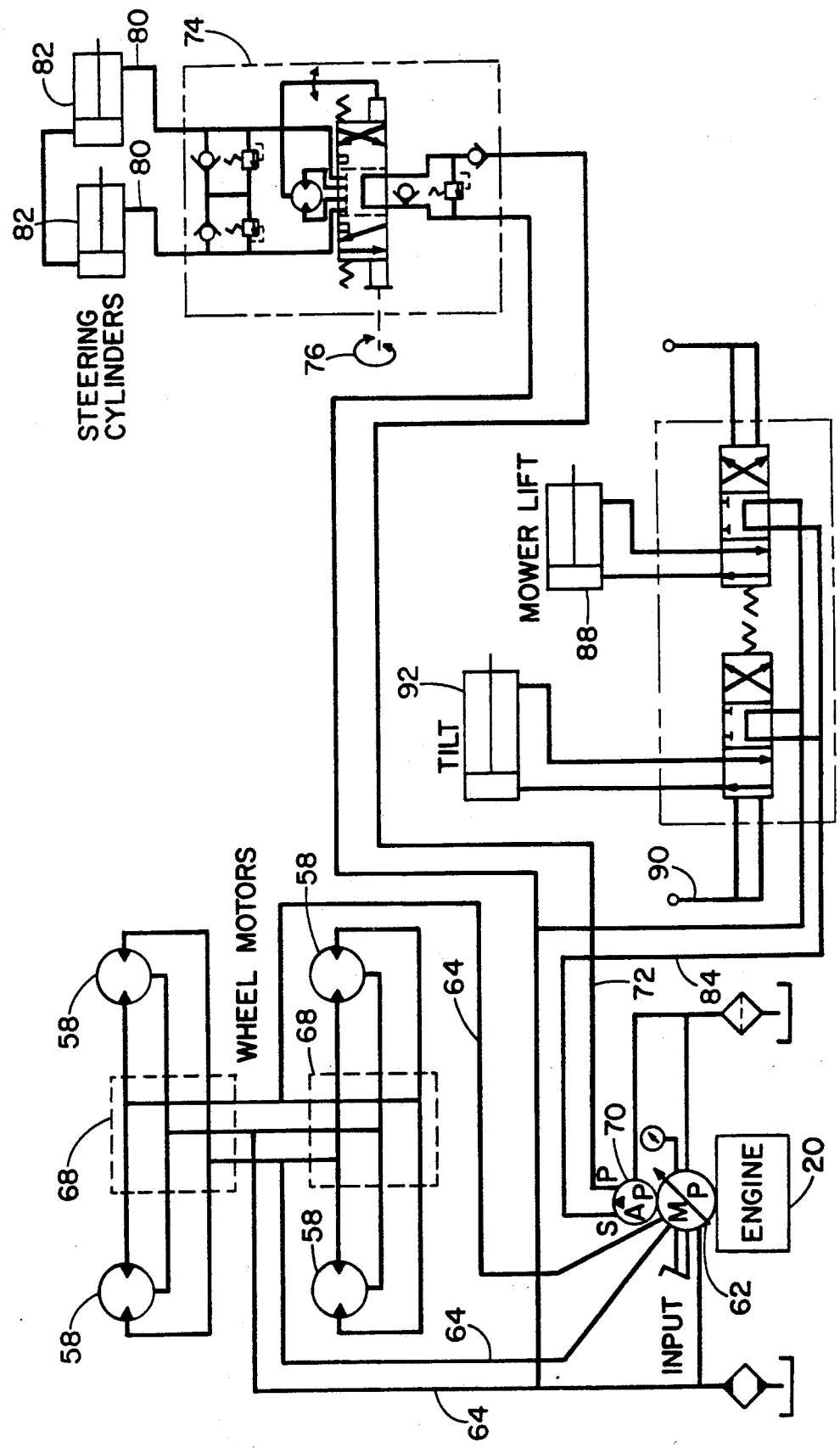
FIG. 3 is a hydraulic flow schematic diagram of the slope mower.

The hydraulic schematic is shown in FIG. 3. Power to drive the wheels is individually provided by an individual hydraulic drive motor 58 attached to each of the wheel motor mounts 34 and arranged to drive the individual wheels directly. The hydraulic drive motors 58 receive fluid pressure from the hydraulic pump motor 62 which is directly coupled to and driven by the power unit 20.

The power unit 20 provides engine power to a hydraulic motor pump 62. The hydraulic pump motor 62 provides pressurized hydraulic fluid to the hydraulic drive motor 58 of each wheel through conduits 64. Hydraulic flow to the hydraulic drive motors 58 is fully reversible through the operation of the speed control foot pedal 66. Positive traction is assured by the installation of a wheel motor flow divider network 68 which provides a uniform distribution of the hydraulic fluid causing an equal amount of power to be applied to each of the hydraulic drive motors 58. A flow divider network 68 is not required for the tractor to be operational but could be utilized.

An auxiliary pump 70 sends primary flow 72 to the steering pump 74. Coupled to the steering pump 74 is the steering wheel 76 which controls the steering pump 74. Hydraulic flow lines 80 send pressurized hydraulic fluid to the two steering cylinders 36 and 42. The extent of the turning of the steering wheel 76 determines the amount of turning.

Secondary flow 84 from the auxiliary pump 70 is sent by conduit to the tilt cylinder 92 and the mower lift cylinder 88. The tilt cylinder 92 provides the means for leveling the tractor body 16 during operations on sloping terrain. The tilting of the tractor body 16 is accomplished by actuating a tilt control lever 90 which controls a tilting hydraulic cylinder 92 having the cylinder end 94 attached to the left side of the tractor frame and the piston end 96 attached on the right rear axle member 28. By extending or contracting the tilting hydraulic cylinder 92, the tractor tilts by rotating on its pivot points 30 and 32. The operator can keep the tractor body 16 in a vertical position by proper operation of cylinder 92.

Figure 5:
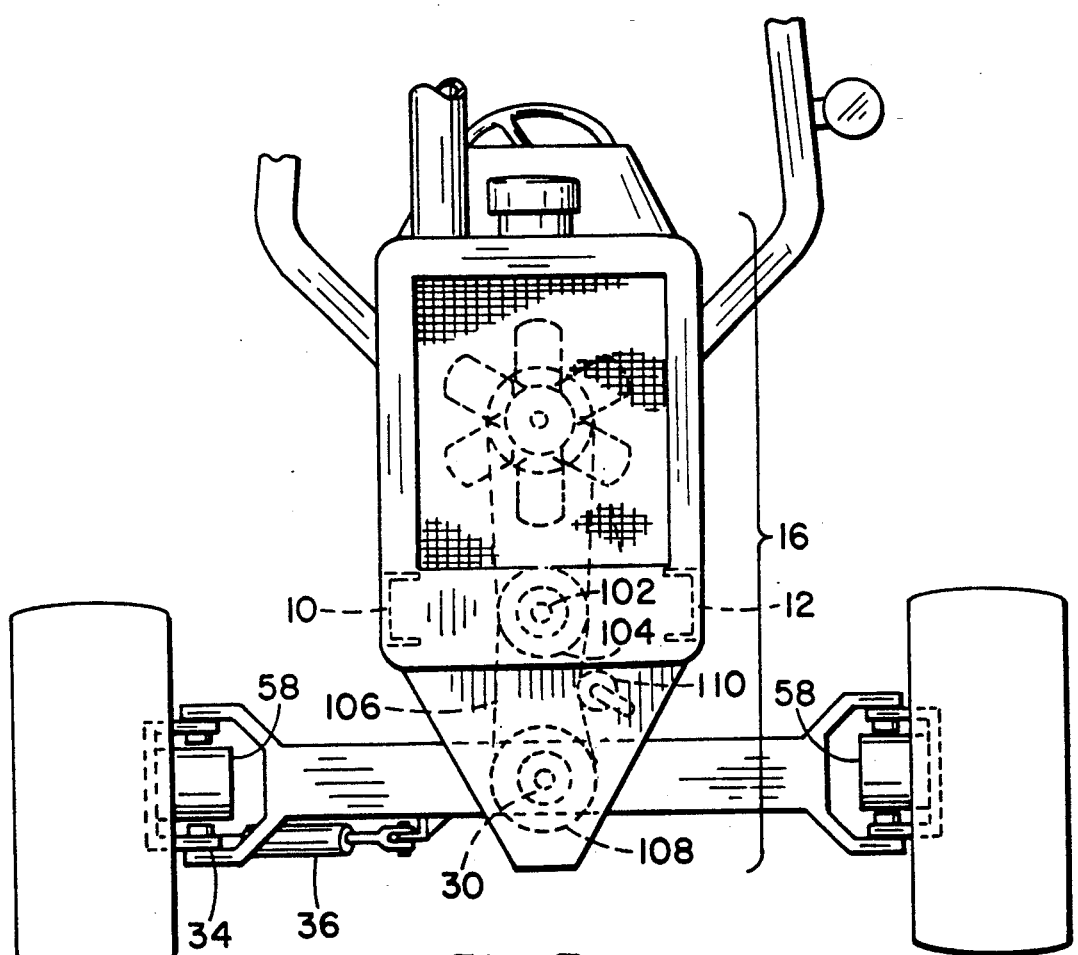
FIG. 5 is front elevational of the slope mower.

We will now discuss means for driving the belly mower 116 or other utility devices which can be attached to the tractor body 16. FIG. 5 shows the power take off system which is a direct drive, belt drive assembly located on the front of the tractor body 16. The power take off system provides direct coupling of engine power from the power unit 20 to the belly mower 116 for durable, heavy duty mowing operations. This includes an engine power take off shaft 102 connected to an engine power take off shaft grooved sheave 104. A drive belt 106 attaches the engine power take off shaft grooved sheave 104 and transmits power to a jack shaft grooved sheave 108. An idler 110 can be engaged or disengaged which applies tension to the drive belt 106. A jack shaft 112 is attached at the forward end to the jack shaft grooved sheave 108 and is attached at the rearward end to a front universal joint 113. The front universal joint 113 couples with and allows the mower shaft 114 to move up and down. This allows the engine power to be transferred to the belly mower 116 or other utility device and lifting action of the belly mower 116. A rear universal joint 115 connects the belly mower 116 to the mower shaft 114.

An alternative configuration for transmitting power from power unit 20 to a utility device attached to the rear of the tractor body 16, can be achieved by removal of the belly mower 116. Then, in the embodiment shown in FIGS. 11 and 12, power take off shaft 118 can be installed instead of mower shaft 114 to the rear end of the jack shaft 112 by a connecting means such as a universal joint. The rearward end of the power take off shaft 118 passes through a hole in the rear pivot point 32. The rearward end of the power take off shaft 118 can then be hooked to a utility device such as a trenching device, auger, sprayer, etc., attached on the rear of the tractor body 16. Thus, power take off shaft 118 can be extended through front pivot point 30 and through rear pivot point 32, thereby engine power can then be transmitted through the front pivot point 30 and rearward through the rear pivot point 32 to an attached device on the rear of tractor body 16.

Another alternative configuration is for transmitting power from power unit 20 to a utility device attached to the rear of the tractor body 16 after removal of belly mower 116, is having the power take off shaft 118 passing through the rear tractor body 16 end member 14, but not through the rear pivot point 32.

FIGS. 1, 2, 6 and 10 show the belly mover 116. The belly mower 116 is attached to the tractor body 16 by two horizontal mower deck stabilizers 120 each having a forward end 121 and a rearward end 123, attached near the front of the belly mower 116. The forward end 121 of the mower deck stabilizers 120 are pivotally attached to reinforce flanges 122, by stabilizer pivot pins 124. Reinforced flanges 122 are attached to the front axle member 26. The rearward ends 123 of the mower deck stabilizers 120 are pivotally attached to brackets 126. A torsion bar 128 is attached between the mower deck stabilizers 120 to ensure the mower deck stabilizers move in unison.

Engine power from the power unit 20 is supplied to the belly mower 116 via the mower shaft 114 to the main drive gear box 130. The main drive gear box 130 transfers the engine power to left and right cutting blades 132 through a series of gears. From the main drive gear box 130, inner shafts 134 are attached to inner coupling hubs 136. Inner coupling hubs 136 are attached to inner sprockets 138. Double link, coupling chains 140 connects inner sprockets 138 and outer sprockets 142. Outer sprockets 142 are attached to outer coupling hubs 144. Shear pins 146 connect the outer coupling hubs 144 to outer shafts 150. Should the cutting blades 132 be stopped abruptly during mowing operations, the shear pins 146 fail, thereby reducing the possibility of damage to the gearing system. Outer shafts 150 are attached to a right side, right angle drive 152 and a left side, right angle drive 154. Gear guards 155 protect the gears and shafts located between the main drive gearbox 130 and right angle drives 152 and 154. Both right angle drives 152 and 154 turn blade drive shafts 156. Attached to the blade drive shafts 156 are blade bars 158. Cutting blades 132 are attached at opposite ends of the blade bars 158 by a shoulder pivot bolt 159 and a shear pin 161. When the shear pin 161 fails, the cutting blade 132 rotates on the shoulder pivot bolt 159 attachment. Similarly, cutting blades 132 are attached to the right side of the belly mower 116 and are driven by drive right angle drive 154.

Means is provided to prevent scalping of the terrain. Attached beneath the belly mower 116, is a unit gauge 160 located between the two cutting blade bars 158. The unit gauge 160 includes a roller 162 rotatably attached to mounting brackets 164 located at each ends of the roller 162. As the center of the belly mower 116 traverses high spots on the mowing terrain, the unit gauge 160 rolls over the crown of the terrain thereby insuring an even cutting path without damaging the vegetation being cut.

Figure 2:
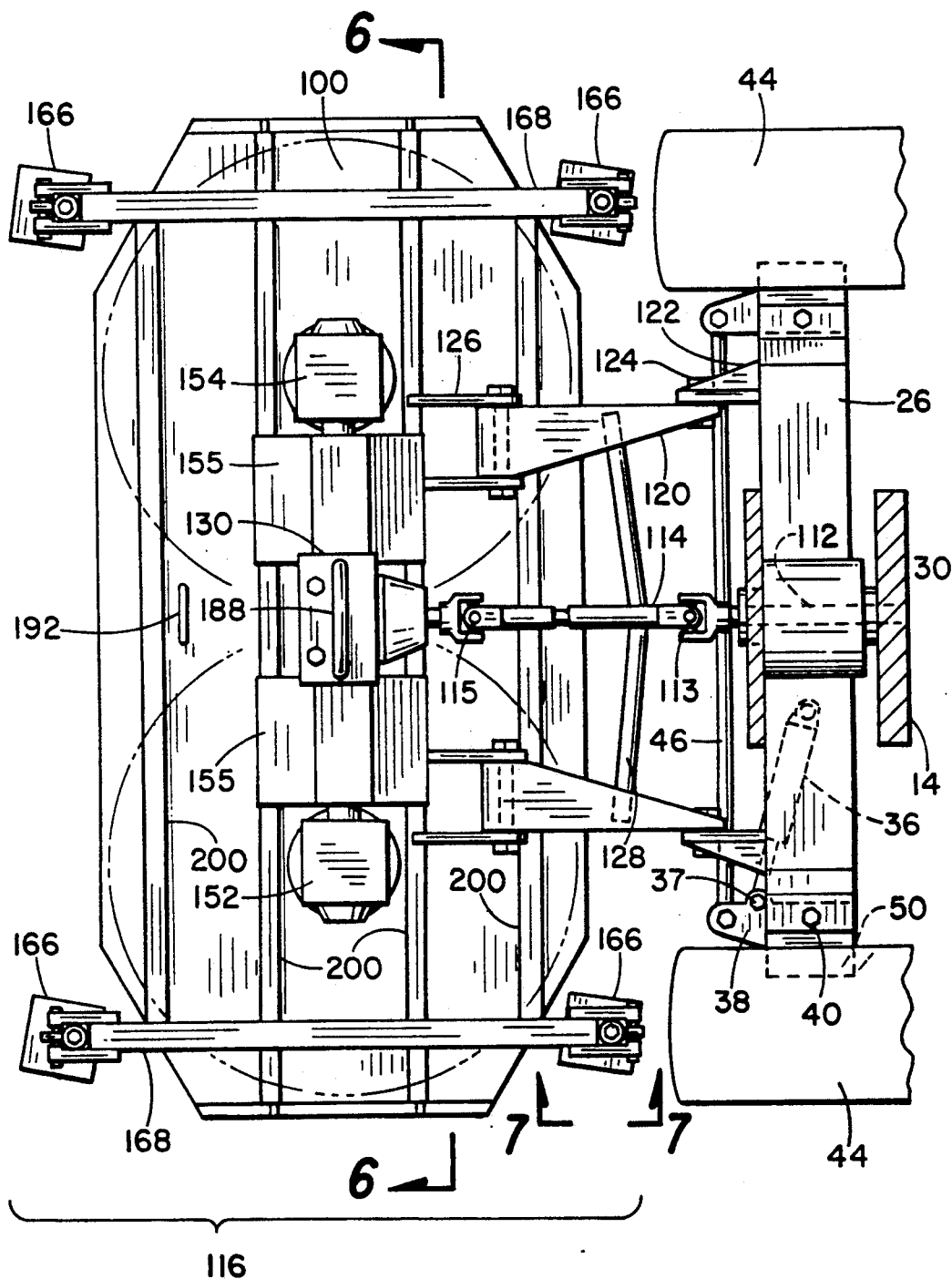
FIG. 2 is a top view taken alone the line 2—2 of FIG. 1.
Figure 6:
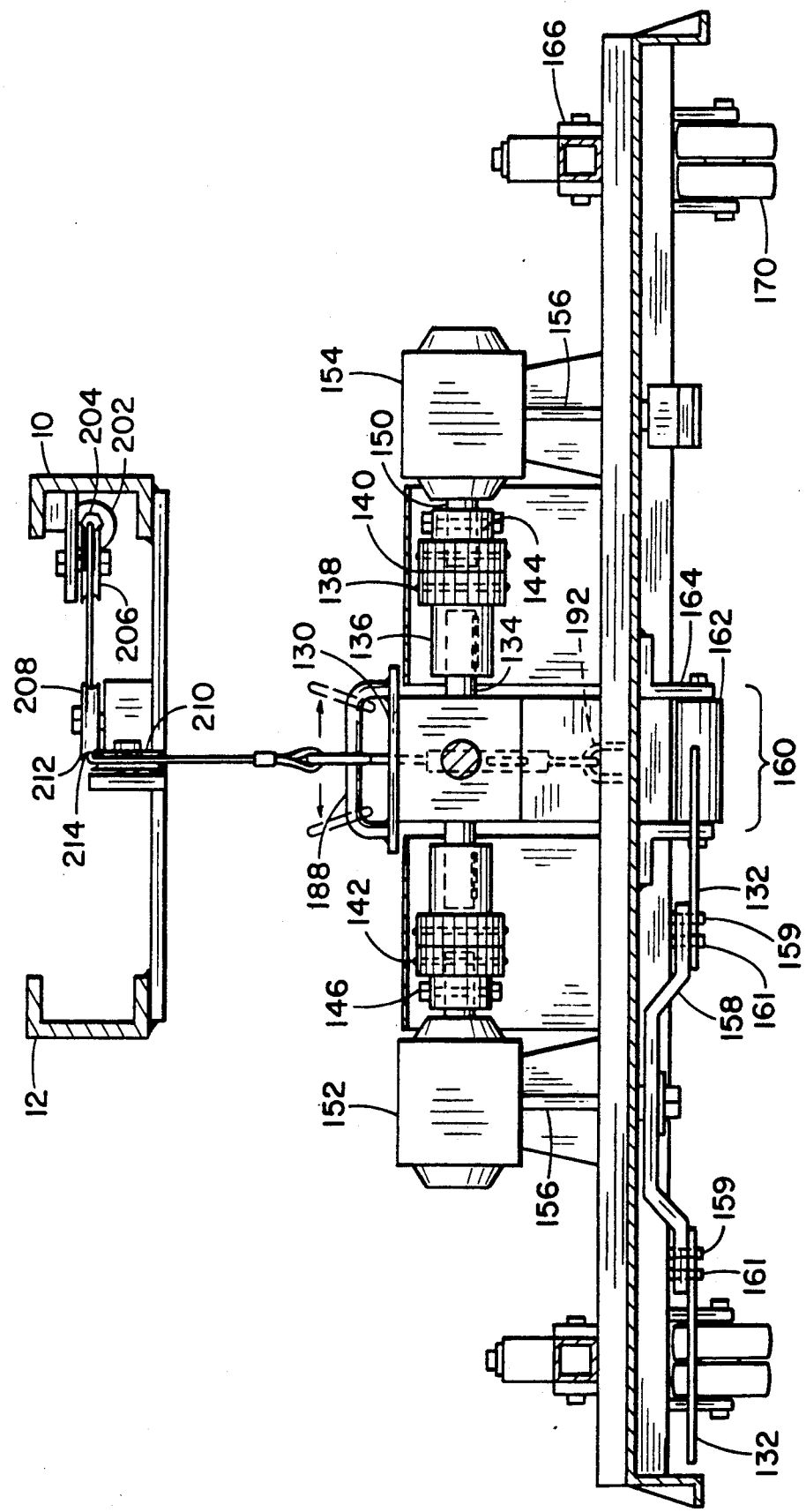
FIG. 6 is a cross sectional view taken along the line 6—6 of FIG. 2.

As shown in FIGS. 2, 6, and 10, four adjustable casters 166 are attached to the belly mower 116 by mower deck arms 168. As shown in FIGS. 7, 8, 9, and 9A, the adjustable casters 166 are designed to withstand great loads and forces normally associated with mowing rough terrain. A plurality of wheels 170 are rotatably attached to a caster yoke 172. The caster yoke 172 is attached to a center shaft 174 and center shaft 174 is rotatably attached to a hollow square hub 176 enclosing center shaft 174. Bearings 178 located at the top and bottom of the hollow square hub 176 allow for easy turning of the caster yoke 172. Up and down movement of the center shaft 174 is limited by the placement of a nut 180 located on upper end of the center shaft 174. Preferably the nut 180 is of a cotter-pin variety to insure that nut 180 does not back off during strenuous operations. Attached on one side of the square, hollow square hub 176 is a flange 182 which has holes 184 for adjusting the caster height. The hollow square hub 176 fits snugly into channel 186 (shown in FIG. 9A) of mower deck arm 168. Bolt 185 extends through a selected hole 184 to obtain the desired height of the cutting blades 132.

The belly mower as shown in FIGS. 6 and 10 is raised and lowered by a hydraulic and cable system. The belly mower 116 is attached to the tractor in four places. In front, two mower deck stabilizers 120 attach the belly mower 116 to the front axle member 26. A mower lift bracket 188 located on top of the main drive gearbox 130 is the third lifting point of the mower deck 98. The fourth attachment is located just aft of the main gearbox 130 at the leveling eye 192.

Fixed to the front axle member 26 are two spaced apart reinforced braces 122 which provide pivotal attachment of the forward ends of the horizontal deck stabilizers 120. The rearward ends of the horizontal deck stabilizers 120 are pivotally the attached to braces 126. A torsion bar 128 attached on each end to the horizontal deck stabilizers 120 ensure the belly mower 116 moves parallel to the terrain. Preferably, the brackets 126 are welded to the belly mower 116. As the belly mower 116 is raised or lowered, the mower deck stabilizers 120 move in an arc.

Stiffeners 200 across the width of the belly mower 116 add strength to the belly mower 116 which is needed not only during mower operations but also while raising and lowering the belly mower 116. Attached to either the right or left tractor frame member 10 or 12 is a hydraulic cylinder 202. Hydraulic pressure moves the hydraulic cylinder piston 204 parallel to the tractor frame 10 and 12. A first pulley 206 is positioned forward of the hydraulic cylinder 202. Located at the midway between right tractor frame member 10 and left tractor frame member 12 is a second pulley 208. The second pulley 208 is positioned slightly aft and in the same plane as the first pulley 206. Positioned perpendicular and forward of the second pulley 208, is a third pulley 210 aligned such that the upper section of the third pulley 210 and the right side of second pulley 212 closest to the right tractor frame member 10, form a channel 214.

Attached to the hydraulic cylinder piston 204 is a first end of the lifting cable 220 and a first end of the stabilizing cable 224. The two cables 220 and 224 are adjacent to each other and pass forward from the hydraulic cylinder piston 204, around the first pulley 206, around the second pulley 208 and extending downward from the third pulley 210. After passing over the third pulley 210, the cables 220 and 224 separate with the second end of the lifting cable 220 attaching to the mower lift bracket 188 located on top of the main drive gearbox 130 and the second end of the stabilizing cable 224 attaching to the leveling eye 192. The second end of the lifting cable 220 is allowed to move laterally on the mower lift bracket 188 as shown in FIG. 6, so that when the tractor body 16 is tilted, the belly mower 116 remains parallel to the sloped terrain. The stabilizing cable 224 does not carry any part of the belly mower 116 load but does prevent the belly mower 116 from flopping during mowing operations.

A three point hitch as shown in FIGS. 11, 12 and 13 is attached to either the front axle member 26 or the rear axle member 28, without interfering with the tilting system of the tractor body 16. If the three point hitch was attached to the tractor body 16, the hitch would tilt in unison with the tractor body 16. As shown two axle mounting plates 226 are welded onto both the front axle member 26 and the rear axle member 28. The three point hitch has the capability of being mounted on either the front axle 26 or the rear axle 28 or both axles 26 and 28, but is shown as mounted on rear axle 28. The three point hitch has two hitch mounting plates 228 which are identical to the axle mounting plates 226 but the hitch mounting plates 228 are welded to the hitch frame 230. Bolts 229 attach the hitch mounting plates 228 to the axle mounting plates 226. Frame gussets 232 provides reinforcement to the hitch frame 230 and one end of the lower lift bar 234 is pivotally attached to frame gussets 232. One end of the upper lift bar 238 is pivotally attached to frame member 230. Upper arm mounts 236 are welded to the upper portion of the hitch frame 230. A torsion bar 240 is welded to and extends between the two upper lift bars 238, both upper lift bars 238 move together in unison. Flange 244 is attached to the non-pivotation end of the upper lift bar 238. Another flange 248 is positioned on the lower lift bar 234 between the pivot point end of the lower lift bar 234 and the lower hitch points 250. Lifting chain 242 connects between flange 244 and 248. The center hitch point 252 is located at midway on the upper horizontal section of the hitch frame 230. Lifting cylinders 254 are provided. The cylinder end 256 on the bottom part of the hitch frame 230 and the piston end 258 is pivotally attached to a flange 260 located on the bottom portion of the upper lift bar 238.

Therefore, a three point hitch as described above allows utility devices to be attached to the tractor and their movement across the sloping terrain to remain parallel with respect to the sloped terrain as if the device where on level terrain. However, the three point hitch allows the tractor body to tilt upslope thereby maintaining the correct center of gravity while operating on sloping terrain.

FIG. 14 shows mounting brackets for mounting a utility device such as a backhoe. Mounting the utility device to the tractor body 16 allows the operator to manipulate the utility device in a vertical orientation while working on sloping terrain. Two J-shaped members 262 are vertically welded and positioned perpendicular to the end member 14. Located between the two J-shaped members 262, are two angled, notched support flanges 264. A rectangular member 263 attaches to end member 14 with on out board side abutting the J-shaped member 262 and the inboard side abutting the angled, notched support flanges 264. Likewise, the angled, notched support flanges 264 are welded perpendicular to the end member 14. The J-shaped members 262 and the angled, notched support flanges 264 support utility devices such as a backhoe mounted on the rear of the tractor body 16.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A gear driven mower, comprising:
   a main drive gearbox having a power means input and a first shaft extending out from the main drive gearbox;
   a first coupling hub attached to said first shaft;
   a first sprocket attached to said first coupling hub;
   a second sprocket coupled to said first sprocket by a double linked chain belt;
   a second hub attached to said second sprocket;
   a second shaft extending out from said second hub;
   a shear pin connected to said second shaft, coupling said second shaft with said second hub;
   a mower blade shaft;
   a right angle drive connecting said second shaft with said mower blade shaft; and
   a mower blade connected to said mower blade shaft.

2. A gear driven mower, as described in claim 1 including a mower blade bar attached to said mower blade shaft and a plurality of mower blades attached to said mower blade bar.

* * * * *